(12) United States Patent
Sakamoto

(10) Patent No.: US 6,496,924 B2
(45) Date of Patent: *Dec. 17, 2002

(54) DATA PROCESSING APPARATUS INCLUDING A PLURALITY OF PIPELINE PROCESSING MECHANISMS IN WHICH MEMORY ACCESS INSTRUCTIONS ARE CARRIED OUT IN A MEMORY ACCESS PIPELINE

(75) Inventor: Mariko Sakamoto, Tokyo (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/229,339

(22) Filed: Jan. 13, 1999

(65) Prior Publication Data
US 2002/0099922 A1 Jul. 25, 2002

(30) Foreign Application Priority Data
Apr. 21, 1998 (JP) ............................................ 10-110616

(51) Int. Cl.[7] .............................................. G06F 9/30
(52) U.S. Cl. ...................................... 712/216; 712/214
(58) Field of Search ................................. 712/216, 217, 712/218, 219, 214, 215

(56) References Cited

U.S. PATENT DOCUMENTS

| | | | | |
|---|---|---|---|---|
| 5,490,280 A | * | 2/1996 | Gupta et al. | 712/23 |
| 5,564,029 A | * | 10/1996 | Ueda et al. | 712/216 |
| 5,860,154 A | * | 1/1999 | Abramson et al. | 711/220 |
| 5,930,489 A | * | 7/1999 | Bartkowiak et al. | 712/200 |
| 5,958,045 A | * | 9/1999 | Pickett | 712/229 |
| 6,016,543 A | * | 1/2000 | Suzuki et al. | 712/233 |
| 6,065,103 A | * | 5/2000 | Tran et al. | 711/156 |
| 6,085,314 A | * | 7/2000 | Asghar et al. | 712/213 |

OTHER PUBLICATIONS

Popescu, "The metaflow architecture", 6/91, pp. 10–13, and 63–72.*

* cited by examiner

*Primary Examiner*—John F. Niebling
*Assistant Examiner*—Stacy Whitmore
(74) *Attorney, Agent, or Firm*—Staas & Halsey LLP (57) ABSTRACT

The memory access arithmetic operation instruction is executed in the data processing apparatus including a memory access pipeline and arithmetic operation pipeline. The decoding and development of the memory access arithmetic operation are carried out after the memory access arithmetic operation instruction is input to the memory access pipeline and the memory access results and the memory access arithmetic instruction are output to the arithmetic operation pipeline.

16 Claims, 7 Drawing Sheets

DATA PROCESSING APPARATUS INCLUDING A PLURALITY OF PIPELINE PROCESSING MECHANISMS IN WHICH MEMORY ACCESS INSTRUCTIONS ARE CARRIED OUT IN A MEMORY ACCESS PIPELINE

BACKGROUND OF THE INVENTION

1. Field of the Invention

The present invention relates to a data processing apparatus including a memory access pipeline and an arithmetic operation pipeline which operate independently of each other, and particularly to a CISC type superscalar processor having an arithmetic operation which includes a memory access.

2. Description of the Related Art

Figure 9:
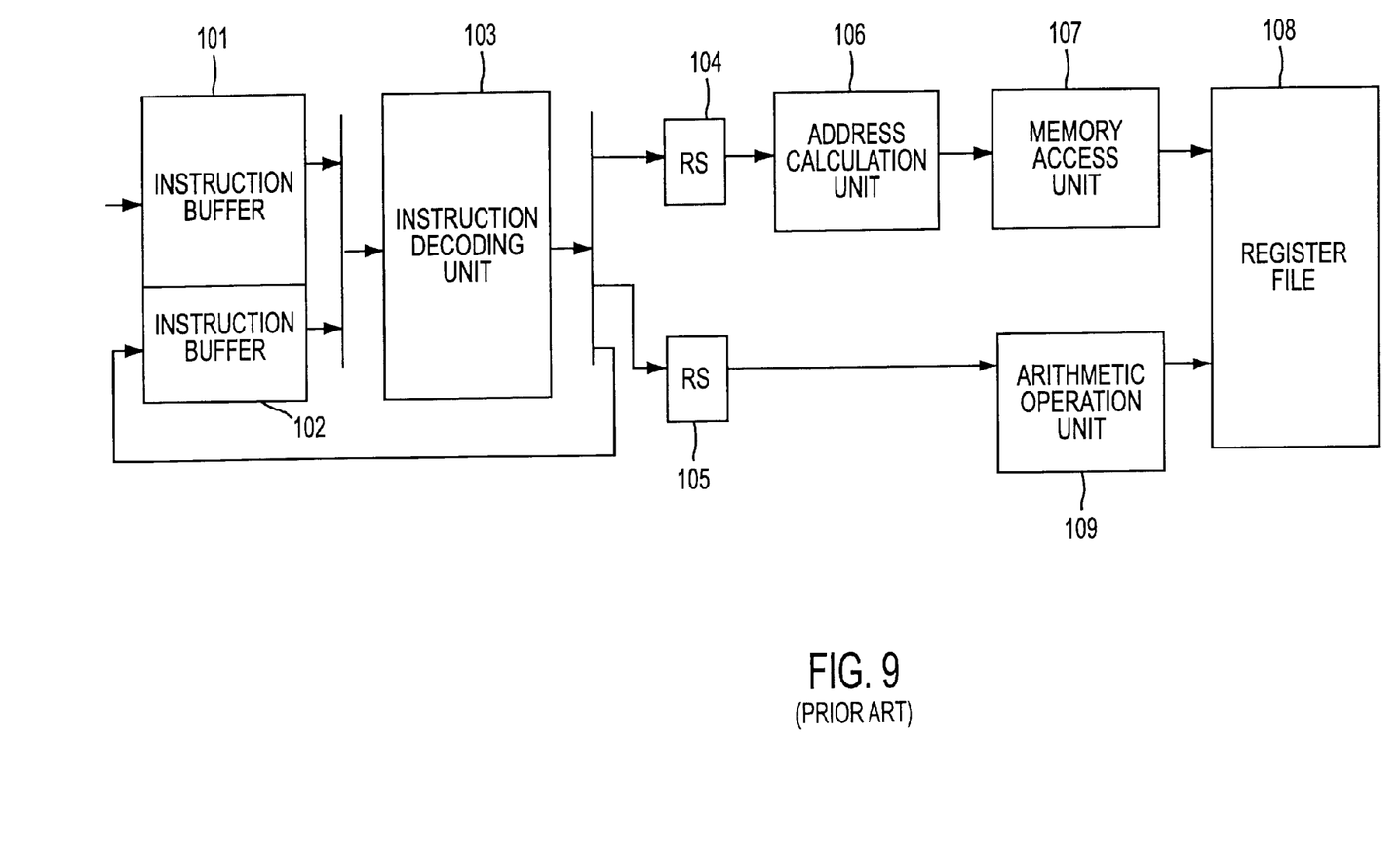
FIG. 9 is a structural diagram of an existing CISC type superscalar system processor.

FIG. 9 shows a structural example of an existing CISC type superscalar processor. An instruction is transmitted to an instruction decoding unit 103 from an instruction buffer 101 for execution of a meaning analysis process (decoding), checking and acquiring process and an instruction developing process.

The checking and acquiring process analyzes which buffer the current operation needs, if there is free entry at or sufficient free space in each specific buffer, and keeps the entry space of all specific buffers for a current operation. It is necessary that there is a free entry at each specific buffer unit to decode an operation. Using an add operation by way of example, an add operation needs entry at 104, 106 and 105 in FIG. 9. When all buffers have free entry in the cache, the add operation can be decoded. For example, if 104 and 105 is OK but 106 has no free entry, the add operation cannot be decoded. An add operation will stay in the decoder and check entry again in cache cycle until entry of 106 becomes free.

The instruction development involves dividing an operation, for example, an add operation, into two processes. The first process is a load operation where the operands are obtained and the second process is the add operation itself where the operands are added.

With respect to complicated instructions (for example, a memory access operation of reading a long length of data from memory or writing it to memory that cannot be processed by a single memory access), if an instruction requires several cycles to develop, the instruction stays in the instruction decoding unit 103 for several cycles. The instruction buffer 102 is the buffer for complicated instructions.

With respect to such complicated instructions, the instruction in the instruction buffer 101 is sent to the instruction decoding unit 103 and thereafter the instruction execution process is conducted for a plurality of cycles, for example, instruction decoding unit 103, to instruction buffer 102, to instruction decoding unit 103, to instruction buffer 102, to instruction decoding unit 103, and so on.

If an instruction requires a read or write operation for a long length of memory data, which cannot be processed by a single memory access, the instruction stays in instruction buffer 102 and instruction decoding unit 103 until the reading or writing operation is complete.

With respect to the memory access arithmetic operation, after the instruction decoding unit 103 decodes the instruction, it is transmitted to a reservation station (RS) 104 on the memory access pipeline side and to RS 105 on the arithmetic operation pipeline side. In the memory access pipeline side, the address calculation for memory access is conducted in address calculation unit 106 and memory access is conducted in memory access unit 107. The data obtained in memory access unit 107 is written into register file 108.

Meanwhile, in the arithmetic operation pipeline side, the instruction which is decoded is transmitted to RS 105 from instruction decoding unit 103 and waits for the data to be written to register file 108. After the data is written to register file 108, an instruction is transmitted to arithmetic unit 109 from RS 105. Thereafter, arithmetic operation unit 109 executes the arithmetic operation for the data in register file 108.

In FIG. 9, RS 104, address calculation unit 106 and memory access unit 107 provide a memory access pipeline, while RS 105 and arithmetic operation unit 109 provide an arithmetic operation pipeline.

The existing CISC type superscalar processor develops, before the instruction is issued, namely, before the instruction is written to RS 104, RS 105, the processes of analyzing the arithmetic operation instruction including memory access and decomposing the instruction into an arithmetic operation instruction to be executed using the data obtained by the memory access.

Decomposing an instruction will be explained using a storage-to-storage (SS-type) operation. An NC (and Character) operation, as an example, will be discussed below. The instruction NC 2(64,5),0(5) is a 64 byte length instruction where operand 1 has a displacement of 2 added to base register 5 and operand 2 has a displacement of 0 added to base register 5 such that the operand 1 address =value of register 5+2 and the operand 2 address=value of register 5+0.

Generally, an NC operation proceeds as a bit level "and" operation in which a first bit of operand 1 is anded with a first bit of operand 2 and the result of the "first bit anded with first bit" is put or stored in memory in place of operand 1's first bit. This bit level operation is repeated for the second bit and so on until the end the of length of the operand is reached. (An attribute of length is the number of "BYTE". If length is 4, then 32(=4×8) bits would be anded.) If there is an updating space between operand 2 address and operand 2 address plus length of the result data, the memory data loading is done one byte at a time.

When the first bit of operand 1 is corresponds to the 17th bit of operand 2, the result of anding the first bits of operand 1 and operand 2 is stored in the first bit of operand 1. When the 17th bit of operands 1 and 2 are anded, the result is stored in the 17th bit of operand 1 which is the 1st bit of operand 2. This means that the and of the 17th bit of the operands should be performed properly.

Thus, it might be necessary that this NC operation process data one byte at time, 64 cycles to load for operand 1 and 64 cycles to load for operand 2, 64 cycles to "and" operand 1 data and operand 2 data, 64 cycles to store the result.

The existing CISC type super scalar processor executes the following 4 steps or items before the issue of the instruction; (1) determine if the NC operation's operand 2 reference is from an updated memory area, (2) set the NC operation to process one byte data at a time, (3) determine if the length of NC operation is 64 bytes, (4) decompose the NC into 64 groups of (operand 1 load, operand 2 load, operand 1 data 'and' operand 2 data, sotre the result of operand 1 data area). In this example, decomposing or decomposition involves dividing the operation into 64 parts.

The existing CISC system has following problems because complicated instructions are developed before they issue.

The instruction is developed at instruction decoding unit 103 where all instructions are transmitted. If a plurality of cycles are required to develop an instruction, the execution timing of the other instructions, which may be executed more quickly, might be delayed. Since the instructions are developed before they issue, the memory access arithmetic operation instruction is transmitted to both the memory access pipeline and arithmetic operation pipeline. Since the instruction that includes memory access is stored in RS 104 in the arithmetic operation pipeline, entry of RS 104 is used for these instructions. Therefore, in some cases, RS 104 becomes full and transmission of the subsequent register arithmetic operation instructions stops.

Since a plurality of cycles are required for memory access, the memory access arithmetic operation instruction in RS 105 of the arithmetic operation pipeline might remain in RS 105 for a long time. Thereby, execution of a subsequent register arithmetic operation instruction is possibly prevented.

SUMMARY OF THE INVENTION

It is an object of the present invention to solve the above problems and effectively use the arithmetic operation pipeline even during execution of a memory access arithmetic operation instruction.

A first embodiment of the present invention includes a plurality of pipeline processing mechanisms, comprising a memory access pipeline for accessing memory and a calculation pipeline for executing arithmetic operations. A device is provided in the memory access pipeline to decode and develop instructions for arithmetic operations including memory access whereby decoding and development of arithmetic operation instructions including memory access do not take place in the stage before inputting the instruction to the memory access pipeline and arithmetic operation pipeline, but rather decoding and development of arithmetic operation instructions including memory access are conducted in the memory access pipeline after the arithmetic operation instruction including the memory access is transmitted to the memory access pipeline.

In a second embodiment of the present invention, transmission of subsequent instructions to the memory access pipeline are prevented when the arithmetic operation instruction including memory access is developed over a plurality of cycles in the memory access pipeline.

In a third embodiment of the present invention, a device acquiring resources to hold the data read from memory in execution of the arithmetic operation instruction including memory access and to transmit the data stored in the resource to the arithmetic operation pipeline is provided.

In a fourth embodiment of the present invention, in the data processing apparatus of the third embodiment, when the resource cannot be acquired, a waiting condition occurs while the current condition is maintained until a vacant area is generated in the resource.

In a fifth embodiment of the present invention, in a data processing apparatus of any of the first through fourth embodiments, a device receiving the data read from memory is provided to transmit the memory data reference arithmetic operation instruction to the arithmetic operation unit in the arithmetic operation pipeline from the memory access pipeline.

In a sixth embodiment of the present invention, in the data processing apparatus of the fifth embodiment, a device judging a priority sequence between the memory data reference arithmetic operation instruction transmitted from the memory access pipeline and the instruction input from the heading portion of the arithmetic operation pipeline to interpret the instruction as the arithmetic operation object is provided.

DETAILED DESCRIPTION OF THE PREFERRED EMBODIMENT

Figure 1:
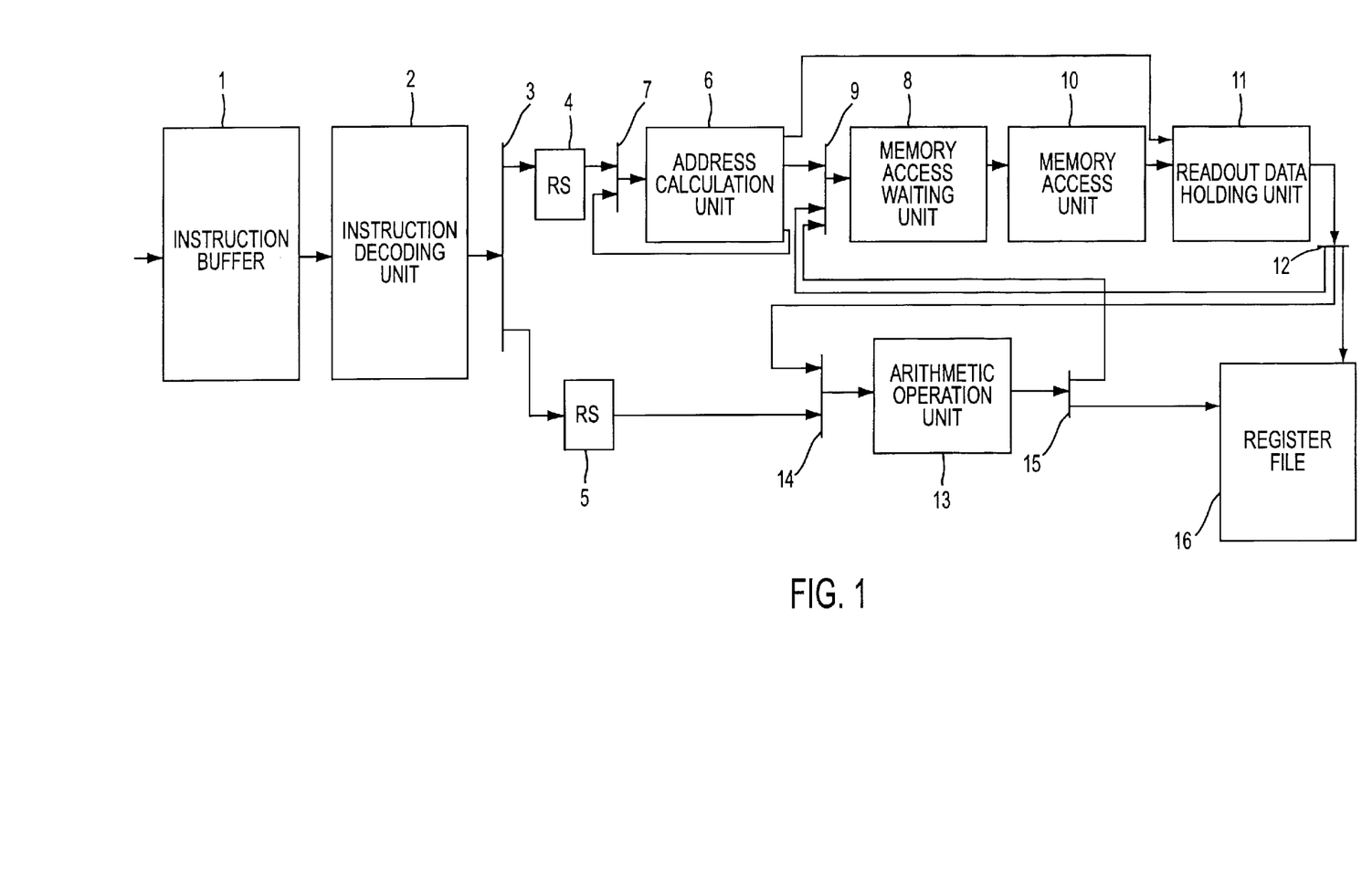
FIG. 1 is a structural diagram of the data processing apparatus of the first embodiment of the present invention.

FIG. 1 is a structural diagram of a data processing apparatus of the first embodiment of the present invention. The data processing apparatus of the present invention includes instruction buffer 1, instruction decoding unit 2, instruction decoding unit output circuit 3, reservation station (RS) 4 in the memory access pipeline side, reservation station (RS) 5 in the arithmetic operation pipeline, address calculation unit 6, address calculation unit input circuit 7, memory access waiting unit 8, memory access waiting unit input circuit 9, memory access unit 10, readout data holding unit 11, readout data holding unit output circuit 12, arithmetic operation unit 13, arithmetic operation unit input circuit 14, arithmetic operation unit output circuit 15 and register file 16.

RS 4, address calculation unit input circuit 7, memory access waiting unit 8, memory access unit 10 and readout data holding unit 11 comprise the principal section of the memory access pipeline. Moreover, RS 5 and arithmetic operation unit 13 comprise the principal section of the arithmetic operation pipeline.

Functions of address calculation unit 6, memory access waiting unit 8 and readout data holding unit 11, which are principal units included in the present invention, will now be explained.

Address calculation unit 6 calculates the memory address to be accessed from the register (base register/index register) and the immediate value and the function to decode the instructions. For the instructions which require a plurality of times to access the memory, an instruction execution operation is conducted. Access to the memory which is performed in a plurality of cycles includes the case where a data read access and a data write access are conducted simultaneously. This means that two kinds of memory access are performed when an access is made to write the arithmetic operation result to the data read address.

Moreover, in the case of a CISC type instruction, it is also specified to read the data of a length which cannot be covered by only one memory readout request. In this case, an alignment process which involves resetting the address value is performed. For example, if there is a 4 byte alignment rule, the address value must be a number that can be clearly divided by 4. If a computer architecture, such as the Fujitsu M series general purpose computer which has a 1 byte alignment rule is used, all address values are aligned. However, if plural byte data is needed, the plural length data must be loaded at one time, in spite of loading 1 byte data at plural times. There exists a rules between memory address and loading length of 1 time. The alignment process decides which rule should be used for a current operation and aligns the operation. Memory access alignment is calculated from a data address and then a plurality of readout instructions are developed. This is also applied to the data writing operation.

Moreover, in some cases, some of the data are read as a complicated instruction and calculation is conducted with this data. In some cases, the length of data read by the first reading operation is different due to the data address alignment process. Consideration of these cases is made in address calculation unit 6. This information is used for the instruction transmitting control in readout data holding unit 11.

When instructions are developed over a plurality of cycles, address calculation unit 6 does not accept new instructions from RS 4 and recognizes that the instructions are developed over a plurality of cycles.

Memory access waiting unit 8 is provided for the memory access instruction generated in address calculation unit 6 to wait for the time to enable memory access. When priority rank of the memory access is different depending on the instructions, a next instruction for memory access is selected by memory access waiting unit 8.

In readout data holding unit 11, the buffering process to hold the data read from memory, the instruction decoding process for making reference to the data and the process of sending the instruction to the arithmetic operating section are executed.

In FIG. 1, the instruction executing process flow is as follows. An instruction in instruction buffer 1 is decoded in the instruction decoding unit 2. The register arithmetic operation instruction is sent to RS 5 in the arithmetic operation pipeline side. Then the memory access operation instruction is sent to RS 4 in the memory access pipeline side.

RS 5 dispatches the arithmetic operation instruction in which data dependencies are resolved. This could be done without relation to the memory access instruction to be sent to the memory access pipeline side.

An instruction of RS 4 in the memory access pipeline side is sent to address calculation unit 6. In address calculation unit 6, the instruction is analyzed and the memory address for the operand is calculated from the register (base register/index register) and the immediate value. Address calculation unit 6 executes the alignment process by the data length and address and the process of relating the instruction and then sends the instruction to memory access waiting unit 8. Moreover, address calculation unit 6 sends the instruction to memory access waiting unit 8 and also executes the processes of acquiring the data holding entry in readout data holding unit 11 and sending the necessary information to readout data holding unit 11.

In memory access waiting unit 8, the instruction having a highest priority issues a memory access request to memory access unit 10. The data read from the memory by the memory access process in memory access unit 10 is sent to the entry prepared in readout data holding unit 11 and is then stored there.

An instruction is transmitted to arithmetic operation unit 13 with the control of readout data holding unit 11. Moreover, an instruction is also transmitted to memory access waiting unit 8 with the control of readout data holding unit 11. In addition, for the instruction which does not require an arithmetic operation, data is written into register file 16 from readout data holding unit 11.

In the case of an instruction to write the arithmetic operation result to the memory, the arithmetic operation result is transmitted to memory access waiting unit 8. In the case of an instruction write the arithmetic operation result to the register, the result is transmitted to register file 16 from arithmetic operation unit 13.

Figure 2:
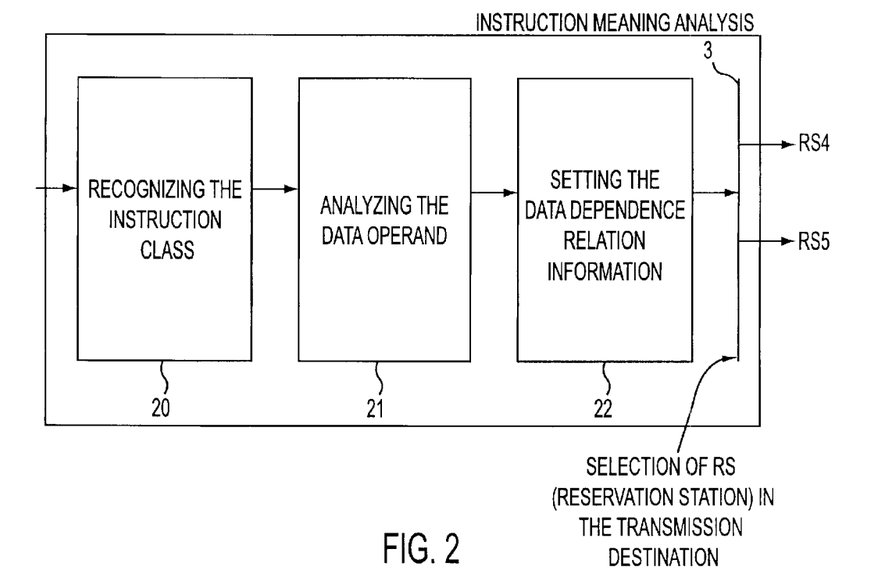
FIG. 2 is a structural diagram of an instruction decoding unit and an instruction decoding unit output circuit.

The internal structure of each unit of FIG. 1 will now be explained. FIG. 2 shows the structure of the instruction decoding unit 2 and instruction decoding unit output circuit 3 shown in FIG. 1. As the instruction in instruction decoding unit 2 is decoded, the instruction class recognizing process 20, the operand data analyzing process 21 and the data dependence relation information setting process 22 are executed.

Data dependency can be described as follows with respect to:

Operation ID 1→AR 2,5
Operation ID 2→AR 3,5
Operation ID 3→AR 3,6

An AR (add register) operation is a RR-type (register-to-register) operation and both operand 1 and operand 2 of the AR operation are general register numbers. AR performs an "add" (add the value of operand 1 register and the value of operand 2 register) and writes the result into operand 1 register. As noted above, Operation ID 1 references register 2 and register 5, and writes into register 2, Operation ID 2 references register 3 and register 5, and writes into register 3. Both operations refer to register 5. However, Operation ID 1 never defines the register that is referred to by Operation ID 2 (that is, the result of Operation ID 1 is not used by Operation ID 2). On the other hand, Operation ID 3 refers to register 3 which is defined by Operation ID 2. As a result, Operation ID 3 must reference register 3 after register 3 is defined. Accordingly, Operation ID 2 has no data dependency to Operation ID 1. Operation ID 3, however, has a data dependency on Operation ID 2. By Operation ID 2 defining register 3, the data dependency between Operation ID 2 and Operation ID 3 would be resolved. This is what is referred to as resolving data dependencies.

In the instruction decoding unit output circuit 3, the instruction accompanied by memory access is transmitted to RS 4 in the memory access pipeline side and the other arithmetic instructions are transmitted to RS 5 in the arithmetic operation pipeline side.

Figure 3:
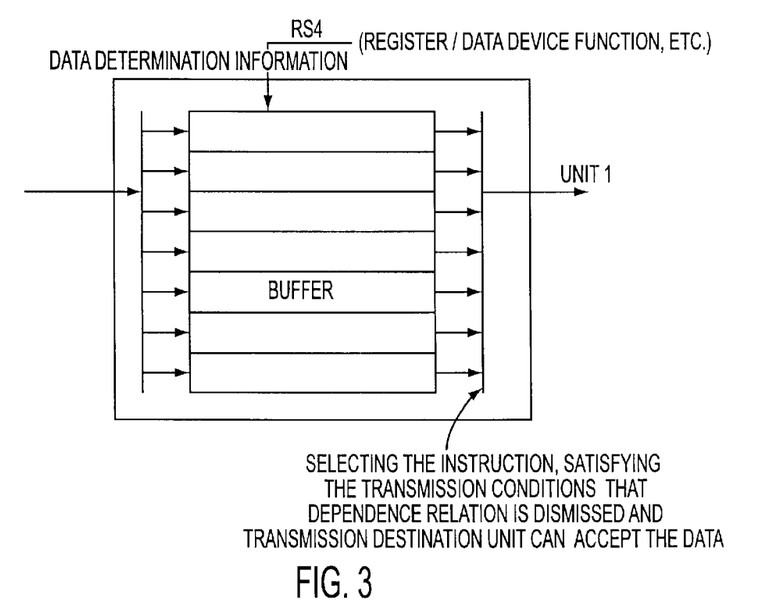
FIG. 3 is a structural diagram of a reservation station RS 4.

FIG. 3 shows the structure of RS 4 in the memory access pipeline side. RS 4 includes a buffer entry to hold a plurality of instructions. The instruction which indicates that the dependence relationship is resolved and the transmitting destination unit is able to receive is selected and then sent to the subsequent units.

In the following explanation, address calculation unit 6 and address calculation unit input circuit 7 together are called UNIT 1 (unit 1), memory access waiting unit 8 and memory access waiting unit input circuit 9 together are called UNIT 2 (unit 2) and the readout data unit 11 and readout data holding unit output circuit 12 together are called UNIT 3 (unit 3).

Figure 4:
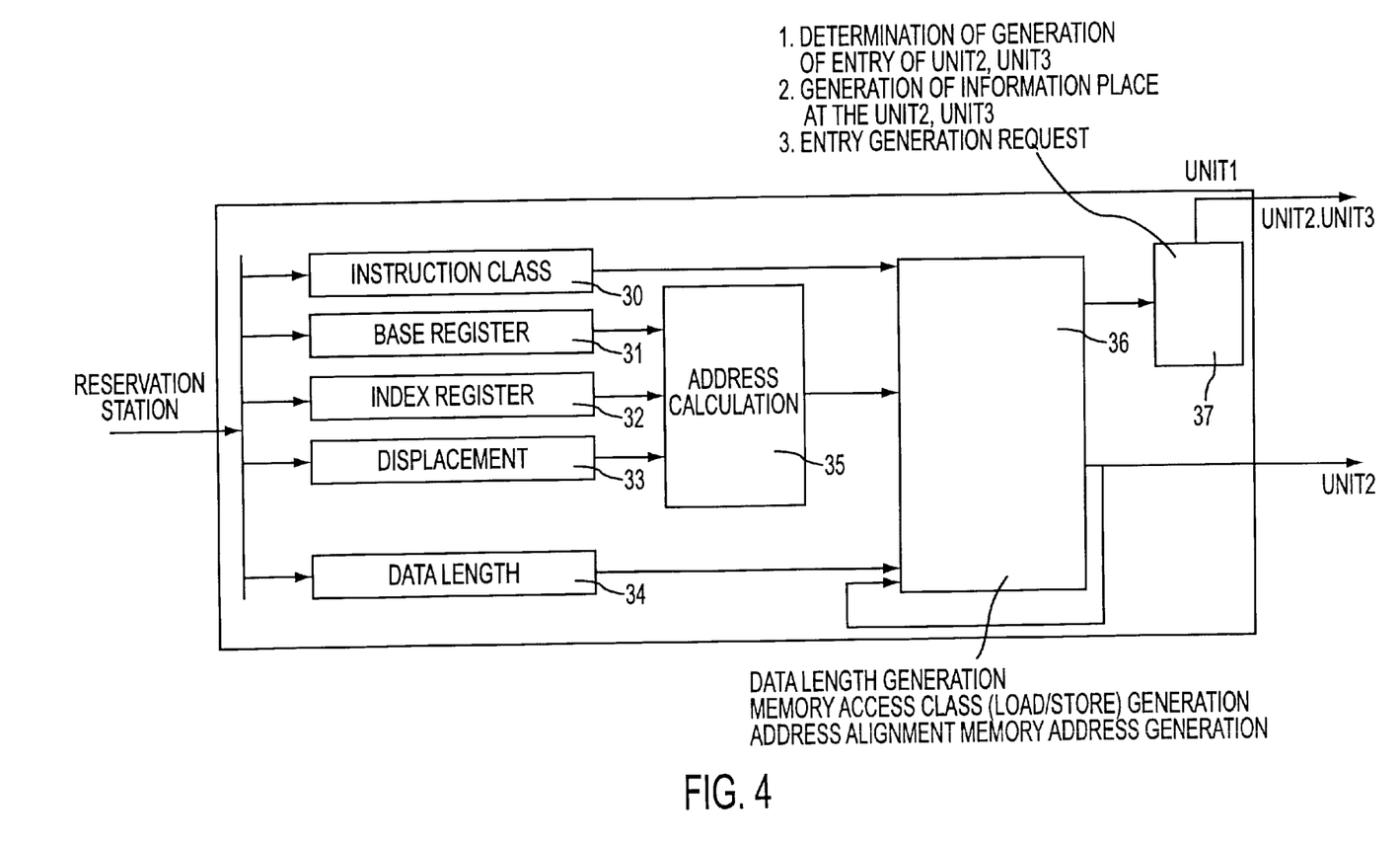
FIG. 4 is a structural diagram of a unit 1 including an address calculation unit and an address calculation unit input circuit.

FIG. 4 shows a structure of unit 1. Unit 1 includes of instruction class holding section 30, base register data holding section 31, index register data holding section 32, displacement holding section 33, data length holding section 34, address calculating section 35, access control information producing section 36 and entry control section 37.

In the access control information producing section 36, the data length producing process, memory access class (load/store) producing process and the address alignment memory address producing process are conducted. Detailed operation of the access control information producing section 36 will be explained later in reference to the flowchart of FIG. 7. In entry control section 37, the judging entry generation process in unit 2/unit 3, generating information process to be set into unit 2/unit 3 and the sending the entry generation request process are executed. Detailed operations of the entry control section 37 will be explained later in reference to the flowchart of FIG. 8.

Figure 5:
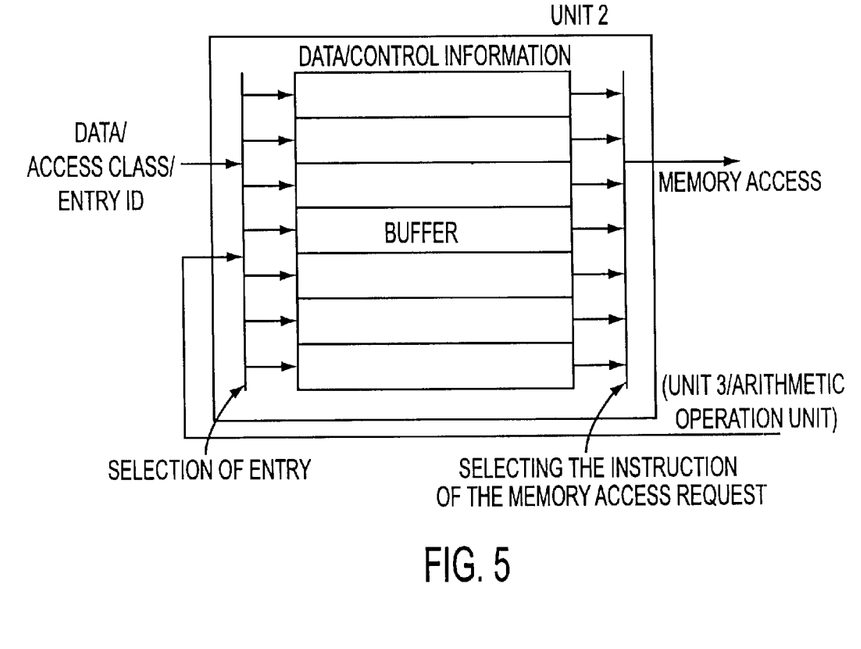
FIG. 5 is a structural diagram of a unit 2 including a memory access waiting unit and a memory access waiting unit input circuit.

FIG. 5 shows a structure of unit 2. In unit 2, a plurality of buffers are provided holding data and various kinds of information. From unit 1, data/access and class/entry ID are input. Data is also input from unit 3 and arithmetic operation unit 13. When an instruction to move the data in memory is to be executed, data is transmitted from unit 3 to unit 2. Moreover, when the process of storing the arithmetic operation result to memory instruction is executed, data is input the unit 2 from arithmetic operation unit 13.

Figure 6:
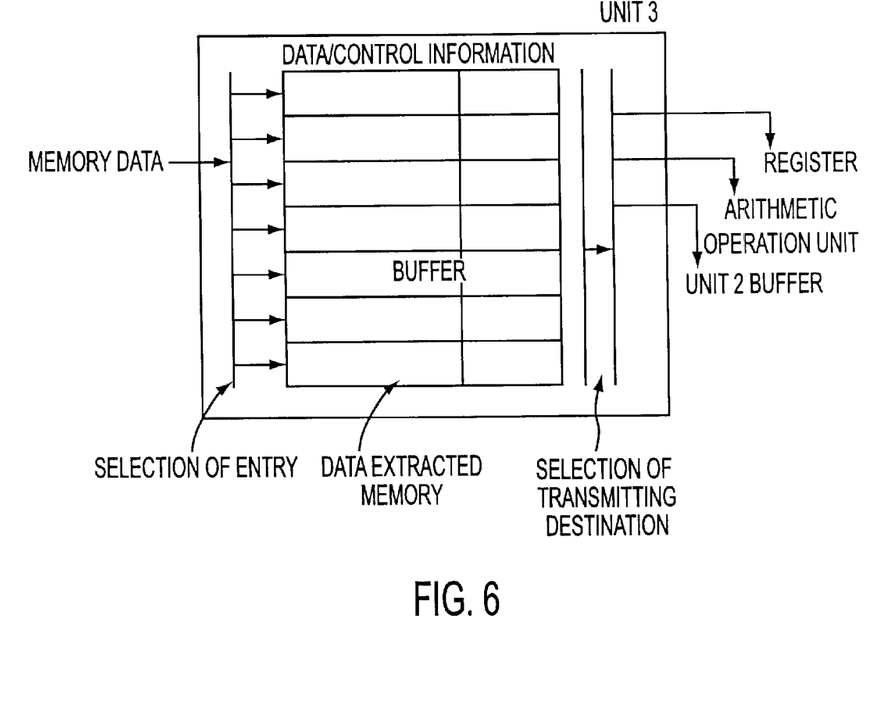
FIG. 6 is a structural diagram of a unit 3 including a readout data holding unit and a readout data holding unit output circuit.

FIG. 6 shows the structure of unit 3. In unit 3, a plurality of buffer entries are provided, as in unit 2, to hold data and various kinds of control information, etc. The data read from memory are stored in the buffer entry. When an instruction to load the data read from memory to the register file 16 is to be executed, buffer entry data is transmitted to register file 16. When the data read from memory calculation instruction is to be executed, data in the buffer entry is transmitted to arithmetic operation unit 13. In the case of the memory data moving instruction, buffer entry data is sent to the buffer of unit 2.

Figure 7:
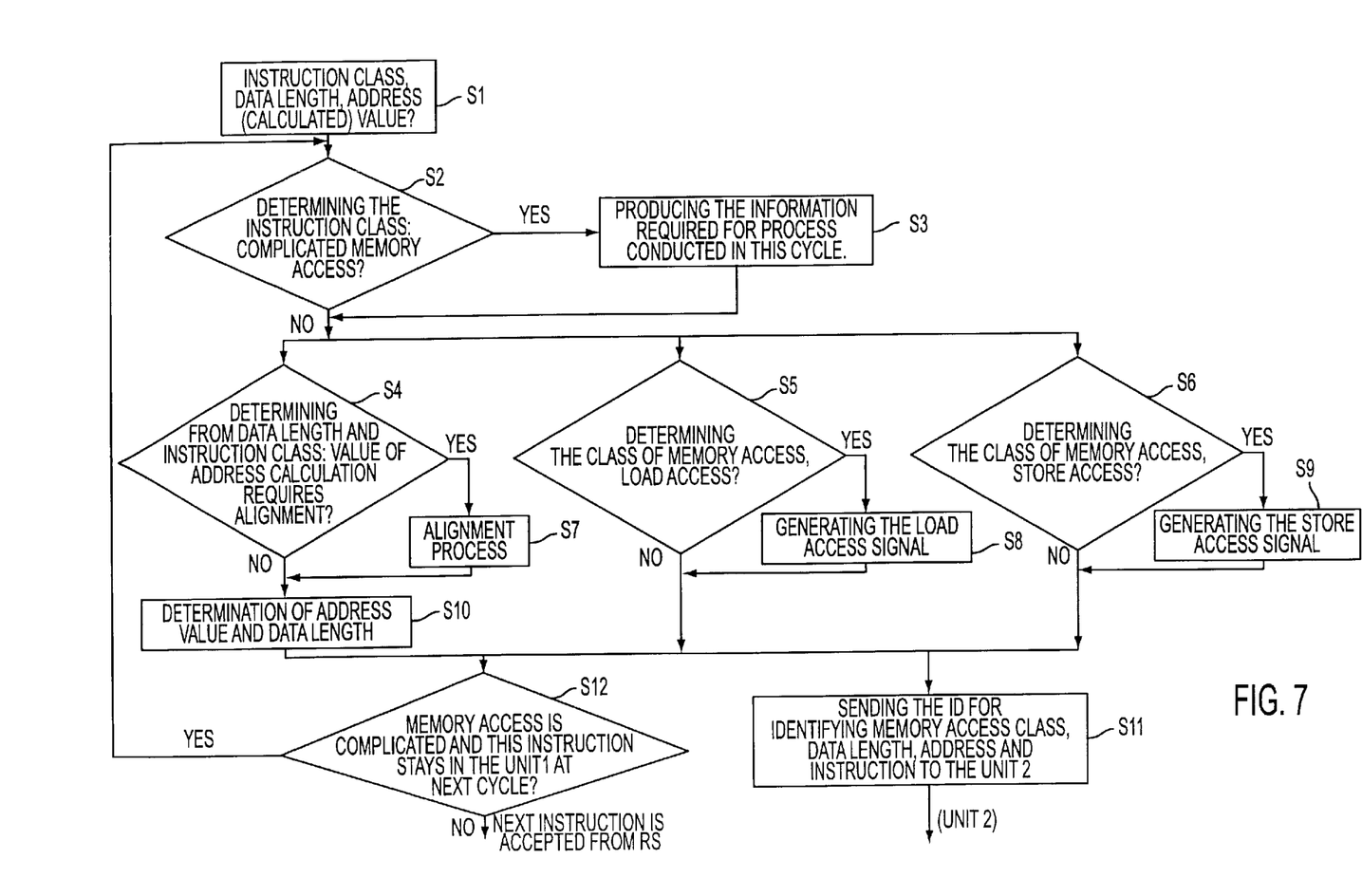
FIG. 7 is a flowchart showing the detailed operations of the access control information producing section 36 of unit 1.

FIG. 7 shows a flowchart indicating the detailed operations of access control information producing section 36 of unit 1.

In step 1 (S1), the instruction class/data length/address (calculation) value are input. In step 2 (S2), it is determined whether the instruction is accompanied by a complicated memory access. If the instruction is accompanied by a complicated memory access, the information required for the process to be conducted in this cycle is produced in step 3 (S3). In regard to the instruction staying in unit 1 for a plurality of cycles, (a) memory access class, (b) address value and (c) data length are generated in the current cycle depending on the class of information and the number of cycles spent in the past. In step 4 (S4), depending on the data length and instruction class, it is determined whether a value of the address calculation requires alignment. When alignment is necessary, the alignment process is executed in step 7 (S7). In step 5 (S5), it is determined whether the class of the memory access is the load access. In the case of the load access, the load access signal producing process is conducted in step 8 (S8).

In step 6 (S6), it is determined whether the class of memory access is store access. In the case of the store access, the store access signal producing process is executed in step 9 (S9).

In step 10 (S10), the address value and data length are determined. In step 11 (S11), the memory access class, data length, address value and ID for identifying instructions are transmitted to unit 2.

In step 12 (S12), a complicated memory access is executed and it is determined whether the next cycle should be processed by unit 1. When the determination result in step 12 (S12) is Yes, operation returns to step 2 (S2) to repeat the next memory access process. When the determination result in step 12 (S12) is No, the next instruction is accepted from RS 4.

Figure 8:
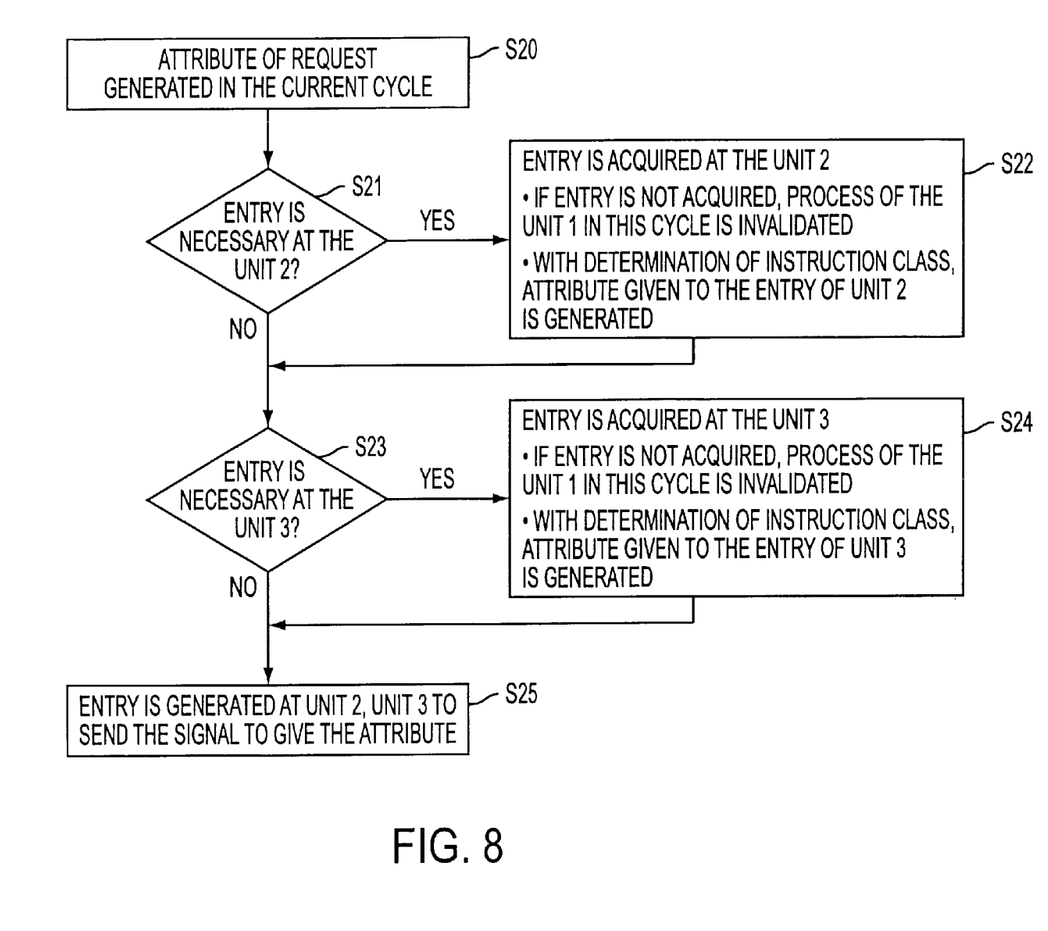
FIG. 8 is a flowchart showing the detailed operations of the entry control section 37 of unit 1.

FIG. 8 shows a flowchart indicating detailed operations of the entry control section 37 of unit 1. In the step 20 (S20), the attribute of the request generated in the current cycle is input. In step 21 (S21), it is determined whether the entry is necessary at unit 2. When the entry is necessary at unit 2, entry is acquired at unit 2 in step 22 (S22). If the entry is not acquired, the process of unit 1 in this cycle is invalidated. When the entry can be acquired at unit 2, the attribute to be given to the entry of unit 2 is produced.

The following attributes are considered as that to be given to the entry of unit 2, the ID identifying instructions, memory access class, whether data should be received from unit 3 (Yes/No) and whether data should be received from the arithmetic operation unit (Yes/No).

In step 23 (S23), it is determined whether entry is necessary at the unit 3. When entry is necessary at unit 3, entry is acquired at unit 3 in step 24 (S24). If the entry cannot be obtained, the process of unit 1 in this cycle is invalidated. When the entry is acquired at unit 3, the attribute to be sent to unit 3 is produced.

The following attributes are considered as those to be given to the entry of the unit 3, the ID identifying the instruction, transmission destination of the data (register file/unit 2/arithmetic operation unit) and the ID identifying instructions to be synchronized. In step 25 (S25), the entry is produced for unit 2 and unit 3 and a signal to give the attribute is also transmitted.

In unit 1, if the resource (entry) of the unit 2/unit 3 cannot be obtained, the waiting condition is generated while keeping the condition unchanged until the vacant area is generated in the resource. The vacant area in the resources of both unit 2 and unit 3 is confirmed at the time of the memory read operation. The vacant area in the resource of unit 2 is confirmed at the time of a memory write operation.

Arithmetic operation unit input circuit 14 in the arithmetic operation pipeline side determines the priority rank between the memory data reference arithmetic operation instruction transmitted from the unit in the memory access pipeline side and the instruction input from the heading section of the arithmetic operation pipeline to determine the instruction as the arithmetic operation object and transmit this instruction to arithmetic operation unit 13.

According to the present invention, since the memory access arithmetic operation instruction is developed in the memory access pipeline, the subsequent register arithmetic operation instruction can be input for execution to the arithmetic operation pipeline in order to improve the processing capability of the process even during the execution of the memory access arithmetic operation instruction.

What is claimed is:

1. A data processing apparatus, comprising:
   a memory access pipeline accessing memory;
   an arithmetic operation pipeline executing arithmetic operations; and
   an instruction decoder, located in a preceding stage of the memory access pipeline and the arithmetic operation pipeline, issuing an instruction, wherein the memory access pipeline exclusively analyzes and develops a memory access instruction and when the memory access pipeline issues the memory access instruction to the arithmetic operation pipeline, an alignment and a priority level between the memory access instruction and the instruction issued from the instruction decoder to the arithmetic operation pipeline are determined.

2. The data processing apparatus according to claim 1, wherein an input of subsequent instructions to said memory access pipeline is stopped when a plurality of memory access instruction is developed and stay in said memory access pipeline for a plurality of cycles.

3. The data processing apparatus according to claim 1, further comprising:

an acquiring unit acquiring a resource holding data that is read from memory by the memory access operation and sending the data that is stored in the resource to said arithmetic operation pipeline.

4. The data processing apparatus according to claim 3, wherein when the acquiring of the resource is not accepted, an operand that causes the acquiring stays and acquires at every cycle until the acquiring is accepted.

5. The data processing apparatus according to claim 1, further comprising:

a sending unit sending a memory data reference arithmetic operation instruction to an arithmetic operation unit in said arithmetic operation pipeline from said memory access pipeline, wherein the memory data reference arithmetic operation instruction receives data read from memory and performs an arithmetic operation by referring to the data.

6. The data processing apparatus according to claim 5, further comprising:

a judging unit judging priority between the memory data reference arithmetic operation that is transmitted from said memory access pipeline and an instruction that passes to said arithmetic operation pipeline from a heading portion of said arithmetic operation pipeline to determine an arithmetic operation object at each cycle.

7. A data processing apparatus, comprising:

an execution pipeline executing arithmetic instructions;

an instruction decoder, located in a preceding stage of a memory access pipeline and the execution pipeline, issuing an instruction; and the memory access pipeline storing a memory access arithmetic instruction, accessing a memory responsive to the memory access arithmetic instruction and outputting memory access results and the memory access arithmetic instruction to said execution pipeline, wherein when the memory access pipeline issues the memory access arithmetic instruction to the execution pipeline, an alignment and a priority level between the memory access arithmetic instruction and the instruction issued from the instruction decoder to the execution pipeline are determined.

8. The data processing apparatus according to claim 1, wherein said execution pipeline executes another instruction while said memory access pipeline accesses the memory responsive to the memory access arithmetic instruction.

9. The data processing apparatus according to claim 1, wherein an input of subsequent instructions to said memory access pipeline is stopped when the memory access arithmetic instruction is developed over a plurality of cycles in said memory access pipeline.

10. The data processing apparatus according to claim 1, further comprising a resource acquisition unit acquiring a resource holding and sending the memory access results which are stored in the resource to said execution pipeline.

11. The data processing apparatus according to claim 4, wherein when an instruction to acquire a resource is stopped, an operand controlling the instruction is acquired at every cycle until the instruction to acquire is accepted.

12. The data processing apparatus according to claim 1, further comprising a sending unit sending a memory data reference arithmetic operation instruction from said memory access pipeline to an arithmetic operation unit in said arithmetic operation pipeline, wherein the memory data reference arithmetic operation instruction comprises the memory access results and instructs to perform an arithmetic operation on the memory access results.

13. The data processing apparatus according to claim 6, further comprising a judgment unit judging a priority between the memory data reference arithmetic operation transmitted from said memory access pipeline and an instruction that passes said arithmetic operation pipeline from a heading portion of said execution pipeline to determine an arithmetic operation object at each cycle.

14. A data processing apparatus, comprising:

an execution pipeline;

a memory access pipeline;

an instruction buffer holding instructions;

an instruction decoding unit receiving and decoding the instructions from said instruction buffer and determining whether the instructions are memory access arithmetic instructions or non-memory access arithmetic instructions;

a first reservation unit located in said execution pipeline, receiving and forwarding the non-memory access arithmetic instructions;

a second reservation unit in said memory access pipeline, receiving the memory access arithmetic instructions from said instruction decoding unit and storing the memory access arithmetic instructions;

an address calculation unit located in said memory access pipeline, receiving the memory access arithmetic instructions and executing an alignment process between a data length and an address;

a memory access waiting unit receiving the memory access arithmetic instructions from said address calculation unit and assigning a priority rank to the memory access arithmetic instructions;

a memory access unit receiving a memory access request from said memory access waiting unit corresponding to the priority rank and executing the memory access request;

a readout data holding unit receiving and storing data read during the memory access request from said memory access unit; and an arithmetic operation unit receiving the memory access arithmetic instructions from said memory access pipeline and the non-memory access arithmetic instructions from said execution pipeline, and performing arithmetic operations in accordance with the memory access arithmetic instructions and the non-memory access arithmetic instructions.

15. A data processing apparatus, comprising:

an instruction decoder issuing an instruction;

a memory access pipeline accessing memory; and an arithmetic operation pipeline executing arithmetic operations, wherein when the memory access pipeline issues a memory access instruction to the arithmetic operation pipeline, an alignment and a priority level between the memory access instruction and the instruction issued from the instruction decoder to the arithmetic operation pipeline are determined.

16. The data processing apparatus according to claim 15, wherein the instruction decoder is operatively connected to the memory access pipeline and the arithmetic operation pipeline.

* * * * *